Aug. 5, 1969  T. B. PREW  3,459,090
CLICKING DIE FOR CUTTING SHEET MATERIALS
AND METHOD OF MAKING SAID DIE
Filed Aug. 22, 1966

INVENTOR
Thomas Benjamin Prew

BY

Watson, Cole, Grindle + Watson
ATTORNEYS

United States Patent Office 3,459,090
Patented Aug. 5, 1969

3,459,090
CLICKING DIE FOR CUTTING SHEET MATERIALS AND METHOD OF MAKING SAID DIE
Thomas B. Prew, Coppenhall, Stafford, England, assignor to Stafford Tool and Die Company Limited, Stafford, England
Filed Aug. 22, 1966, Ser. No. 574,112
Claims priority, application Great Britain, Aug. 31, 1965, 37,185/65
Int. Cl. B26f 1/46; B26d 1/00
U.S. Cl. 83—652                           2 Claims

ABSTRACT OF THE DISCLOSURE

A clicking die formed from a steel strip with at least one cutting edge having a groove machined therein so as to extend inwardly from one plane side face of the strip with its inner end aligned with the cutting edge, the groove containing adhesive and receiving a former with a plan identical in shape to that of the pattern to which a workpiece is to be cut, the outer edge of the former engaging the inner end of the groove and the adhesive serving to secure the former and strip together.

---

This invention relates to cutting tools, and more particularly to so-called clicking dies which are used for cutting sheet materials to specific shapes.

Such dies are usually made of strip steel having cutting edges formed along its two opposite edges. To make the die the strip material is bent around a former or core and secured thereto.

The principal object of the invention is to provide a method of making such a die which constitutes an improvement on the known methods, and provides a stronger die.

In one aspect the invention comprises a method of manufacturing a clicking die comprising the steps of providing a length of metal strip having a cutting edge formed along at least one edge, and having a groove in one face of the strip, the bottom face of the groove being aligned with the cutting edge, providing a former whose plan area is identical with that of the pattern of the piece which is to be cut by the die, forming the strip material around the edge of the former with the edge of the former engaged in the groove, and securing the metal strip to the former.

In another aspect the invention comprises a clicking die comprising a former cut to an identical plan area as the piece which is to be cut by the die and a length of metal strip having at least one cutting edge formed along one of its opposite edges bent around the edge of the former with the edge of the former engaged in the groove, the metal strip being secured to the former by means of adhesive.

The invention will now be further described with reference to one embodiment of the invention as shown in the accompanying drawings, in which.

Figure 1:
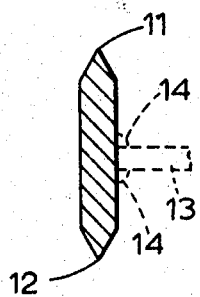
FIGURE 1 shows a section through a piece of steel strip formed with opposite cutting edges of the type conventionally used for making clicking dies.

Referring to FIGURE 1, a cross-section is shown through a piece of steel strip having cutting edges, respectively 11 and 12, formed along its edges. Such steel strip, ready hardened and with the edges sharpened, may be purchased commercially in the form of rolls. It is known to make a clicking die from such steel strip being bent around the former and secured thereto by adhesive 14.

Figure 2:
FIGURE 2 shows the relationship of a pattern to the strip.

It is usual to make a pattern of the piece to be cut by the die and, as shown in FIGURE 2, the former 13 of FIGURE 1 must be made smaller all round its periphery by a dimension 15 which is one-half the thickness of the steel strip when equal facing steel is used or to a depth whereby it is in line with the cutting edge when unequal facing steel is used, otherwise the pieces which are cut by the die will be larger than the pattern. The shapes to be cut by clicking dies may be very complicated and the necessity to make a former which is smaller by the correct amount all round its periphery involves an awkward operation which takes considerable time.

Figure 3:
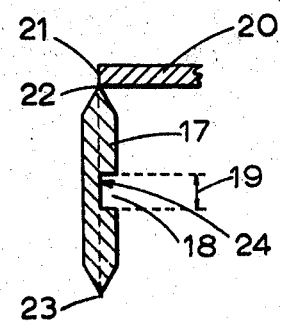
FIGURE 3 shows a strip formed according to the invention.

According to an embodiment of the invention a steel strip 17 (FIGURE 3) is formed with a groove 18, the bottom face 24 of which is in the centre of its width when equal facing steel is used or on the centre line of the cutting edge when unequal facing steel is used, and having a width 19 substantially equal to the depth of the former which is to be used. The pattern 20, when of a suitable thickness substantially equal to or less than the depth 19 of the groove, may now be used as the former since, after being placed in position in the groove 18 and securing it thereto by any suitable means, its peripheral edge 21 will still be in line with the working cutting edge 23. It is, therefore, possible to make formers for the clicking dies merely by making duplicates of the original pattern 20, and the irksome operation of making special former which is slightly smaller all round than the pattern is eliminated. A preferred method of securing the metal strip to the former is by the use of an adhesive.

Figure 4:
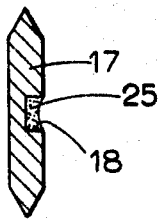
FIGURE 4 shows the strip of FIGURE 3 with the groove filled with adhesive material.

This operation of cementing the steel strip to the former is a somewhat messy operation which usually results in a dirty knife since some of the adhesive is inevitably left on the knife at points where its presence may affect the cutting, particularly when sheet material of a fairly thick nature or multiple layers of a thin material, is being cut. According to a further feature of the invention, illustrated in FIGURE 4, the groove 18 is filled with an adhesive 25 while the steel strip is still in the coil form, so that the operation of applying the adhesive effectively becomes "automated." The presence of the adhesive in the groove makes it possible to bend the knife to its required shape without damaging or affecting the adhesive, because the adhesive is below the plane of the surface and does not come into contact with the bending tools. Moreover, the adhesive may be a contact adhesive so that when the edge of the pattern is pressed into the groove, the only activation of the adhesive necessary is to apply pressure, and if necessary heat, to the steel strip at the pattern edge, irrespective of whether the pattern is made of pattern board, wood or metal. This method of applying the adhesive obviates an unpleasant and messy operation and provides a clean tool.

Since, in a die made in accordance with the invention, the edge of the former is engaged in the groove, there is a greater area of the edge of the former engaged with an equal area of the groove walls than in the known construction in which the edge of the former merely butts against the face of the strip. Accordingly, the die made in accordance with the invention is stronger and is less likely to break when under the cutting pressure.

I claim:
1. A method of manufacturing a clicking die comprising the steps of:
    (a) providing a length of metal strip having a cutting edge formed along at least one edge, and a groove cut so as to extend inwardly from one plane side face of the strip, the inner end of said groove being aligned with said cutting edge,

(b) applying an adhesive into said groove,
(c) providing a former having a plan area which is identical to that of the pattern to which a workpiece is to be cut by the die, and
(d) forming the strip around the edge of the former with the outer edge of the former engaging the inner end of the said groove so that the cutting edge is aligned with the outer edge of said former with the adhesive in the groove serving to secure the strip to the former.

2. A clicking die comprising:
(a) a former cut to an identical plan area to that of the pattern to which a workpiece is to be cut by the die, and
(b) a length of metal strip having a cutting edge formed along at least one edge thereof and a groove cut so as to extend inwardly from one plane side face of the strip, the inner end of said groove being aligned with said cutting edge, and the strip being bent around the outer edge of the former with said outer edge engaging the inner end of said groove, so that the cutting edge is aligned with the outer edge of said former, the former being secured to the metal strip by means of an adhesive contained in said groove.

References Cited

UNITED STATES PATENTS

| 2,129,448 | 9/1938 | Short | 83—652 X |
| 2,293,086 | 8/1942 | Stoddard et al. | 83—652 |
| 3,283,617 | 11/1966 | Kletzker. | |

FOREIGN PATENTS

| 50,826 | 4/1941 | France. |
| 544,656 | 4/1942 | Great Britain. |
| 939,337 | 10/1963 | Great Britain. |

WILLIAM S. LAWSON, Primary Examiner.

U.S. Cl. X.R.

76—107; 83—698